Oct. 20, 1925.

J. R. ARMSTRONG 1,557,960

FLUID MEASURING APPARATUS

Filed Dec. 27, 1922    2 Sheets-Sheet 1

INVENTOR
J. R. Armstrong
BY
W. F. Doolittle
ATTORNEY

Oct. 20, 1925. 1,557,960
J. R. ARMSTRONG
FLUID MEASURING APPARATUS
Filed Dec. 27, 1922 2 Sheets-Sheet 2

INVENTOR
J. R. Armstrong
BY
W. G. Doolittle
ATTORNEY

Patented Oct. 20, 1925.

1,557,960

UNITED STATES PATENT OFFICE.

JAMES R. ARMSTRONG, OF INGRAM, PENNSYLVANIA, ASSIGNOR TO EQUITABLE METER COMPANY, OF INGRAM, PENNSYLVANIA, A CORPORATION OF PENNSYLVANIA.

FLUID-MEASURING APPARATUS.

Application filed December 27, 1922. Serial No. 609,210.

*To all whom it may concern:*

Be it known that I, JAMES R. ARMSTRONG, a citizen of the United States, residing at Ingram, in the county of Allegheny and State of Pennsylvania, have invented certain new and useful Improvements in Fluid-Measuring Apparatus, of which the following is a specification.

This invention is for fluid measuring apparatus and relates to means for measuring the flow of gas through a pipe line, particularly where two meters are connected in parallel.

In the collection and distribution of gases, particularly natural gas, a large number of meters are necessary for measuring the gas flow through the various pipe lines. A company engaged, for instance, in the collection and distribution of natural gas, will have a large number of meters of different sizes for handling larger or smaller quantities of gas. The larger meters are, of course, much more expensive and there is not frequently so large a demand for the larger meters as for the smaller ones. In order, therefore, to reduce the amount invested in large meters, the company will frequently connect two small meters in a pipe line in such manner that the flow will be divided between them. Each of the meters functions independently of the other and record their results separately.

A type of meter commonly used in this connection includes the volume measuring meter of usual construction, having the metering register secured to and driven thereby. This register in turn drives a chart on which a pen records the static pressure maintaining in the line. As the chart is driven proportionately to the volume of gas passing through the meter and the pen records the static pressure at which it passes through, the chart reading may be reduced to give the number of cubic feet of gas which the amount recorded would equal at the pressure at which the gas is to be sold.

Where the meters are connected in multiple, as heretofore described, two charts are necessary and the readings of both meters must be kept together and added.

The present invention has for its principal object the provision of a suitable connection between the two meters for enabling the volume of gas passed through each to be separately recorded on a single chart.

The invention may be readily understood by reference to the accompanying drawings, in which.

Figure 1:
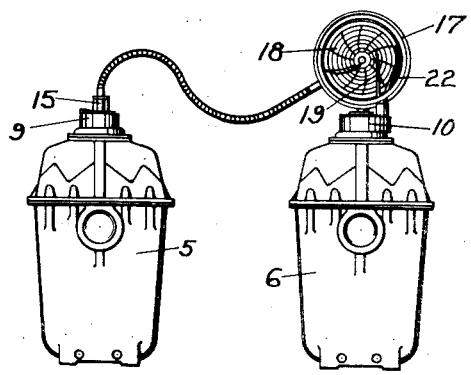
Fig. 1 shows two meters connected in accordance with my invention.
Figure 2:
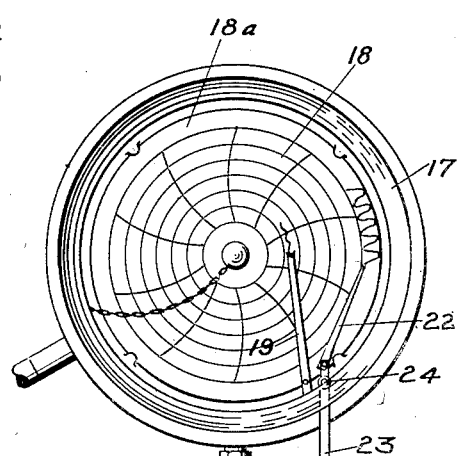
Fig. 2 is a front elevation of the recording mechanism and chart.
Figure 3:
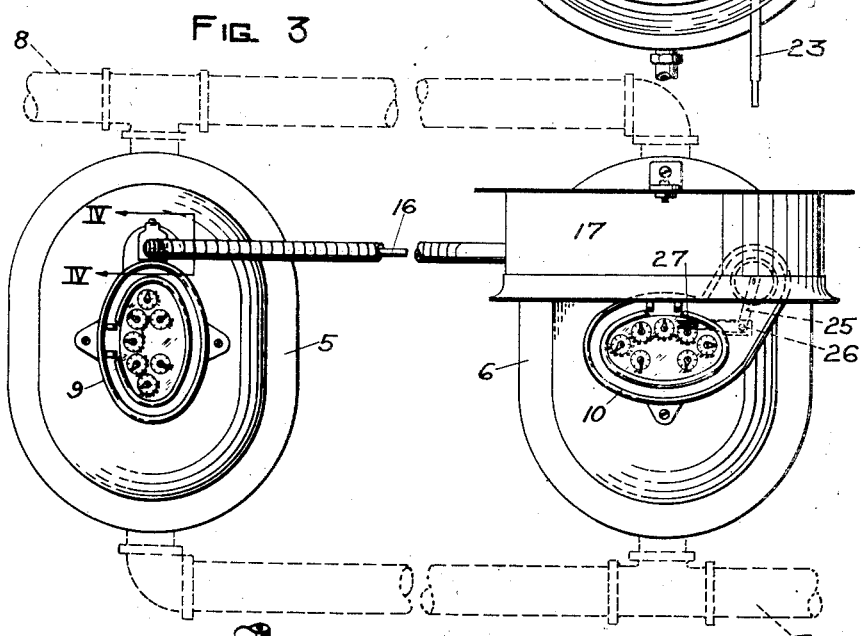
Fig. 3 is a top view of the apparatus shown in Fig. 1, but on a larger scale.
Figure 4:
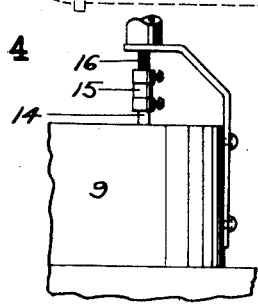
Fig. 4 is a section in the plane of line IV—IV of Fig. 3.
Figure 5:
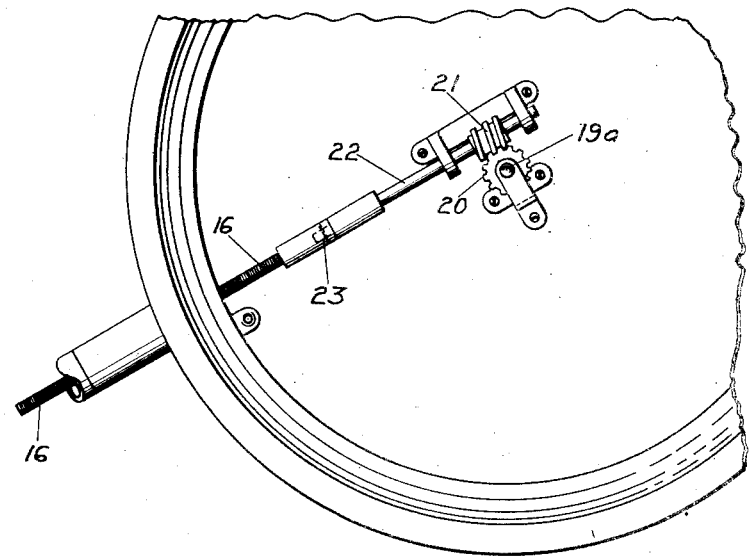
Fig. 5 is a detail view of the chart driving gears.

In the drawings, 5 and 6 are two gas meters of any known or preferred construction which are connected to a common line 7, and deliver into a common pipe 8, so that the flow of gas from line 7 to line 8 is divided through the two meters. Each meter is provided with the usual form of metering register 9 and 10, respectively.

Figure 6:
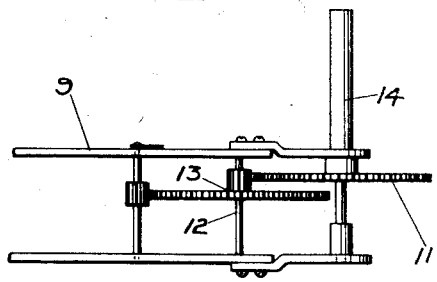
Figs. 6 and 7 are side and top views respectively of gearing used on one of the meters.
Figure 7:
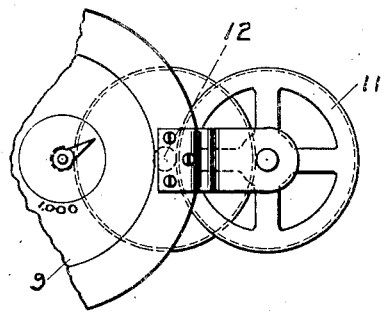

The register 9 has an added gear 11, however, as shown in Figs. 6 and 7, which gear is shown as being driven from the thousand foot indicator, the gearing then being such that wheel 11 is rotated once for every ten revolutions of the thousand foot indicator, designated 12. In other words, in the arrangement shown, gear wheel 11, driven from shaft 12 through wheel 13, rotates once for every ten thousand cubic feet of gas, actual volume, passing through the meter 5. The gear wheel 11 is fixed on shaft 14 and the upper projecting end of this shaft is coupled at 15 to a flexible shaft 16.

Supported on the top of meter 6, in addition to register 10, is a static pressure gauge 17 which carries a removable chart 18. At 19 is a pen arm which is actuated by the static pressure prevailing in the meter or pipe line in the usual manner. As the static pressure for the two meters is substantially the same, it makes little difference on which meter the static pressure gauge is supported, or from what point the static pressure is communicated to the gauge. The chart 18 is carried on a central shaft 19$^a$.

This shaft 19$^a$ has a gear wheel 20 thereon which meshes with a worm 21 on a diagonally extending shaft 22 that extends outside the gauge casing. Shaft 22 is joined at 23 with the other end of flexible shaft 16. The gear ratio between gears 20 and 21 is such that shaft 19ª is rotated a complete revolution for every hundred revolutions of the flexible shaft. That is to say, the chart is rotated once for every million feet of gas, actual volume, which passes through meter 9. The mark left by the static pressure pen, therefore, represents a certain number of feet at the pressure maintaining in the line. Knowing the volume of gas, and its static pressure, the volume of gas to which the known volume is equivalent at any fixed pressure may be determined, as will be readily understood by those skilled in the art.

The chart 18 is divided into a central area which is marked off radially and concentrically. If there are ten radial lines, then the distance between them represents a hundred thousand cubic feet, as the entire circle is a million. Around the central part of the chart is a margin portion, designated 18ª. At 22 is a pen arm, which marks in the marginal portion 18ª.

This pen is oscillated to means of a link 23 pivoted at 24, the lower end of this link being engaged by one arm of a bell crank 25 pivoted at 26. The other arm of the bell crank engages an eccentric pin 27 on the ten thousand hand of meter clock 10. Thus, every time ten thousand cubic feet of gas passes through meter 6, pen 22 makes one complete oscillation. As the chart is rotating during the time the arm is moving, a wave like or sinuous line will be made in the margin of the chart, and the distance between each peak will represent ten thousand cubic feet of gas. In this way the static pressure at which the gas passes through both meters is recorded on a single chart, and the static pressure record is also the record for the volume of gas passing through one of the meters, while the volume of gas passing through the other meter is recorded in the margin of the same chart. Thus, an installation of this kind requires but a single chart where two have heretofore been necessary.

Various changes may be made in the construction of the apparatus within the contemplation of my invention, and under the scope of the appended claims.

What I claim is:

1. Apparatus for measuring gas comprising a pair of gas meters, connected in parallel in a common line, a recording device common to both meters including means for graphically recording the volume of gas passing through each meter and the static pressure at which the gas passed through the meters.

2. Apparatus for measuring fluids including a pair of volume meters connected with a common source of supply, a movable record, means connected with one meter for moving the record, and means for recording on the record the volume of fluid passing through the other meter, and means for recording the pressure of the fluid passing through the meters on the record.

3. Apparatus for measuring fluids comprising a pair of meters connected in parallel in a common line, a record driven by one of the meters proportionately to the volume of fluid passing therethrough, means for recording on the record the distance the record is moved, and other means for recording on the same record the volume of fluid passing through the other meter.

4. Apparatus for measuring fluids comprising a pair of meters connected in parallel in a common line, a chart driven by one meter proportionately to the volume of fluid passing therethrough, means for graphically recording the movement of such chart and the static pressure of the fluid being measured, and means for graphically recording on said chart the volume of fluid passing through the other meter.

5. Apparatus for measuring fluids comprising a pair of meters connected in parallel with a common supply, gearing for each meter driven thereby according to the volume of fluid passing therethrough, a recording chart mechanism connected with the gearing of one meter and driven thereby, and a recording means connected with the gearing of the other meter and adapted to record on a chart moved by said recording chart mechanism.

6. Apparatus for measuring fluids comprising a pair of meters connected in parallel with a common supply, gearing for each meter driven thereby according to the volume of fluid passing therethrough, a chart moving mechanism, means for transmitting motion from the gearing on one meter to said chart moving mechanism, a static pressure actuated pen adapted to record on a chart moved by said chart moving mechanism, and another pen connected with the gearing of the other meter and moved transversely of a chart carried by said chart moving mechanism to make a record thereon.

7. the combination with two meters connected in parallel in a pipe line, each meter having a register thereon, of a static pressure recording gauge mounted on one meter and having a movable chart and a recording pen, a connection for driving said chart from the register of the other meter, a second pen for recording on said chart, and means driven from the meter register on which the gauge is carried for moving said pen transversely across a portion of the chart.

In testimony whereof I affix my signature.

JAMES R. ARMSTRONG.